(12) United States Patent
Arefeen et al.

(10) Patent No.: US 8,639,474 B2
(45) Date of Patent: Jan. 28, 2014

(54) MICROCONTROLLER-BASED DIAGNOSTIC MODULE

(75) Inventors: Mohammed Arefeen, Houston, TX (US); Mark Rayner, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 268 days.

(21) Appl. No.: 12/872,509

(22) Filed: Aug. 31, 2010

(65) Prior Publication Data

US 2012/0053901 A1 Mar. 1, 2012

(51) Int. Cl.
*G05B 23/02* (2006.01)
*G07C 3/00* (2006.01)

(52) U.S. Cl.
USPC ............ 702/183; 340/524; 340/532; 340/539

(58) Field of Classification Search
USPC .......................................................... 702/183
See application file for complete search history.

(56) References Cited

U.S. PATENT DOCUMENTS

| 4,168,796 A * | 9/1979 | Fulks et al. ................... 714/734 |
| 7,191,097 B1 * | 3/2007 | Lee et al. ...................... 702/183 |
| 2005/0083784 A1 * | 4/2005 | Iseli et al. ........................ 367/60 |
| 2008/0168267 A1 * | 7/2008 | Bolen et al. ................... 713/100 |
| 2008/0303800 A1 * | 12/2008 | Elwell ........................... 345/173 |

* cited by examiner

*Primary Examiner* — Tung S Lau
*Assistant Examiner* — Stephanie Chang
(74) *Attorney, Agent, or Firm* — Banner & Witcoff, Ltd.

(57) ABSTRACT

A portable diagnostic module may use a standardized physical interface to connect to a series of sensors. The module can be configured to accept different types of sensor outputs, and to collect the sensed data for use in local or networked analysis to help identify errors and faults before they occur.

12 Claims, 9 Drawing Sheets

MICROCONTROLLER-BASED DIAGNOSTIC MODULE

FIELD

Aspects of the disclosure generally relate to monitoring devices to address actual or potential equipment failures. In some embodiments, aspects of the disclosure relate to measuring motor drive operating parameters and detecting the presence of fault conditions.

BACKGROUND

Large industrial and non-industrial systems and equipment often include many different interacting components, each of which has potential to fail and cause damage or disruption to the remaining components while in use. To prevent such failures from occurring, many systems include fuses and similar control safeguards to react to dangerous conditions. For example, a mining company may use a water pump system to remove excess water from a mine while performing its digging or extraction work. While in use, the motor driving the water pump system may shut off if the motor controller detects an operating condition that meets or exceeds one of the controller's preconfigured settings. Such settings can be, for example, high temperature, excessive voltage or current draw, water level, etc., and exceeding any one of these conditions can result in shutting down the pump. Although these settings serve as safeguards against immediate damage to the system and its environment, when a system experiences repeated shutoffs it is often an indicator that something further within the system (beyond the simple overvoltage or high temperature) is not operating correctly, and these settings do not address the true nature of the problem. Accordingly, there remains an ever-present need for improved monitoring and control measures.

BRIEF SUMMARY

The following summary generally addresses many of the features described herein, but is not intended to limit the scope of this disclosure or identify features of greater importance to the claims herein. Although a portable diagnostic module configurable for use in multiple drives of electric motors is described herein, it should be noted that the various features of the diagnostic module described are equally applicable to numerous other types of motors and systems in which measurement, prediction and reporting capabilities are desirable to improve internal system visibility and monitor operating conditions.

One or more aspects described herein relate to providing a diagnostic module that may be configured for use as a microcontroller-based board or computing device within various types of industrial and non-industrial systems and applications, e.g., distribution and transportation systems, broadcasting systems, power systems, infrastructure systems, etc. The diagnostic module may operate as a standalone system designed to be added to or removed from a larger system environment without interfering with the operation or functionalities of that system.

The diagnostic module may include multiple communication ports for communicating with various components internal and/or external to the drive in which the diagnostic module is used. In one or more arrangements, the diagnostic module may include a port for system programming and debugging, a port for communication with other components and peripherals of the host system, a port for interfacing with an external network, as well as multiple configurable input/output (I/O) ports.

According to another aspect described herein, the diagnostic module may perform various measurement, monitoring, recording, predicting, calculating and reporting activities to provide a host system with improved assessment and diagnostic capabilities. The diagnostic module may be configured to serve a particular purpose within the host system and operate to collect and record data in an automated fashion.

The diagnostic module may record and analyze a system's operational data and history, even when no particular system fault or failure has occurred.

The module may include one or more physical interfaces that are configured to receive input signals emanating from one or more external sensors. The module may reconfigure its physical interfaces to accommodate different types of sensors, allowing the module to be removed from one system and inserted into another. The module can be portable, and can be used to collect sensor information from sensors at different job sites (e.g., from different mining water pump locations in two different mines).

The diagnostic module may be used to monitor sensors from multiple different drives of varying size and complexity, therefore making the module an extremely portable tool that is useful across many systems.

The various drives and systems to be used in conjunction with the diagnostic module can have their own sensors configured to detect any desired operating parameter, such as temperature, voltage, current, and other such operating parameters, and the diagnostic module being used with such drives may pass data to a collective interface to connect to all of the sensors.

The diagnostic module may include numerous diagnostic capabilities that allow for monitoring and recording operating conditions of a system through various communication channels, and generating appropriate response signals based on such monitored and recorded conditions.

The module may include network communication capability, and may report conditions to a remote server via a communication network (e.g., telephone, cellular, satellite, Internet connection, etc.). The remote server may monitor multiple diagnostic modules, and can process gathered diagnostic data to identify failure trends and normal operating parameters.

The diagnostic module may also include a physical interface having one or more output pins associated with various output capabilities. For example, the diagnostic module may have output pins for providing signals to alert users about certain existing and/or resolved system conditions or system events that may occur in the near future. Additional output pins may be for triggering external circuits, modules, and/or other such components when the diagnostic module determines that a particular event is about to occur that may affect or otherwise impact these external components. In one or more arrangements, the diagnostic module may also include output pins that allow for managing various auxiliary systems, such as cooling fans, system shut-down mechanisms, and the like.

Additional features described herein will be addressed in greater detail below.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

By way of general introduction, aspects of the disclosure relate to providing a method, system and apparatus for monitoring the performance of industrial and non-industrial systems (e.g., equipment, devices, combinations of systems, etc.) to detect the existence of, and predict the future occurrence of, operational failures. In one arrangement, a portable diagnostic module may be attached to a system and configured so as to provide the system with increased measurement, detection and diagnostic capabilities. The portable diagnostic module may be added to or removed from a system, and may be reconfigured from one system to the next such that each system is provided with a customized assessment of its performance. As described herein, the portable diagnostic module may communicate with a remote network server to send and receive data specific to the system in which the module is used, as well as, general reference data and statistics used for analysis purposes.

Figure 1:
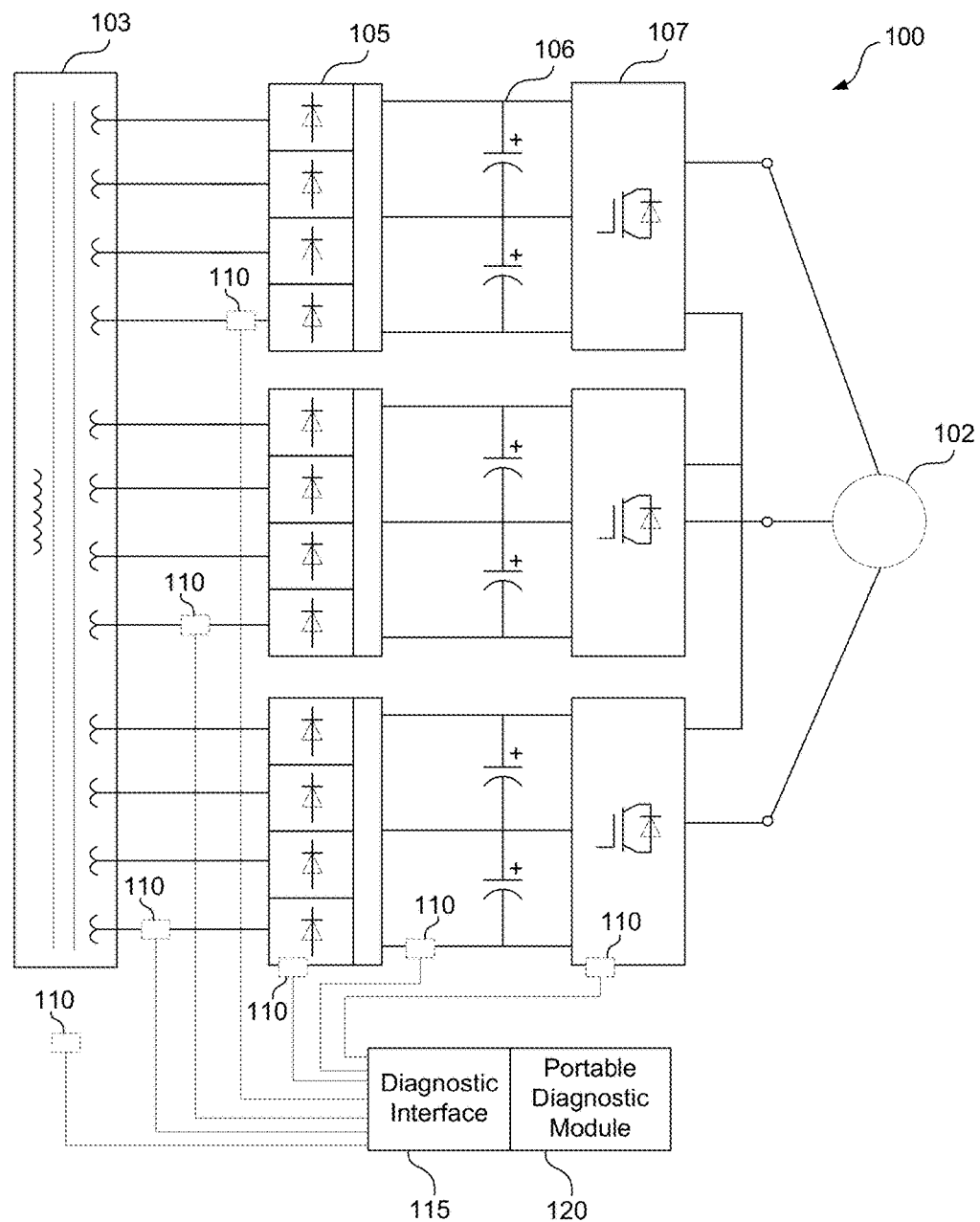
FIG. 1 is a schematic diagram of an example drive system in which one or more aspects described herein may be implemented.

FIG. 1 illustrates an example system 100 in which the various features described herein may be implemented. The system 100 generally couples a three-phase power supply to an end load, such as a motor 102, and includes intermediate circuitry to help provide a desired set of voltages and waveforms to ultimately drive the motor 102. The intermediate circuitry may include a transformer 103 and various components coupled to different secondary windings of the transformer, such as rectifiers 105, DC bus capacitors 106 and inverters 107. The system 100 may be a component of a larger system, such as a manufacturing plant, data center, and the like, in which numerous drive systems are utilized either alone or in combination with one another.

Motor 102 may be any of a variety of different types of motors, such as motors typically implemented in industrial systems and applications. For example, Motor 102 may be a three-phase induction motor, multi-phase stepper motor, as well as, any of the various universal motors. It is to be appreciated that although aspects described herein may make reference to a particular motor and/or drive type, such references are only made for purposes of illustrating various aspects relating to the diagnostic module of the present disclosure, and are not intended to limit the scope of the present disclosure in any way.

In some arrangements, the various components of the system 100 may be under the control of a logic controller (not shown). The logic controller may be hard-wired logic circuitry, or may be one of a variety of reprogrammable devices, such as a programmable processor or a programmable logic controller (PLC). The logic controller may include, or may operate with, one or more computer-readable media (e.g., hard drive, compact disk, flash memory, etc.) storing computer-executable instructions that cause the controller to perform the various steps and functions described herein.

The system 100 may also include one or more sensing devices 110 located at various points throughout the system to sense (e.g., detect, measure, read, calculate, determine, etc.) certain electrical properties, conditions and/or parameters of the system. For example, system 100 may include several circuits or sensors each configured to detect current, voltage, temperature, humidity, airflow, fluid level, or other condition or parameter of the motor and/or motor environment while the motor is operating. In one arrangement, sensing devices 110 may be individual circuits each configured to detect the same parameter or group of parameters of the system at different locations. In another arrangement, each circuit may be configured to detect a different parameter of the system, or detect the same parameter at different times during motor operation. For example, one circuit may be dedicated to detecting a temperature of the motor, a second circuit dedicated to detecting a current flowing through the motor, a third circuit dedicated to detecting a voltage passing into the motor, and so on. As shown in FIG. 1, sensing devices 110 may be located on and/or around the various components of the system 100, and may all be wired to a single, standardized interface, such as diagnostic interface 115, for input to a portable diagnostic module 120. The sensing devices 110, the standardized interface, and the various wiring and pin arrangements that connect them are described in greater detail below with reference to FIGS. 4A through 4C.

Figure 2:
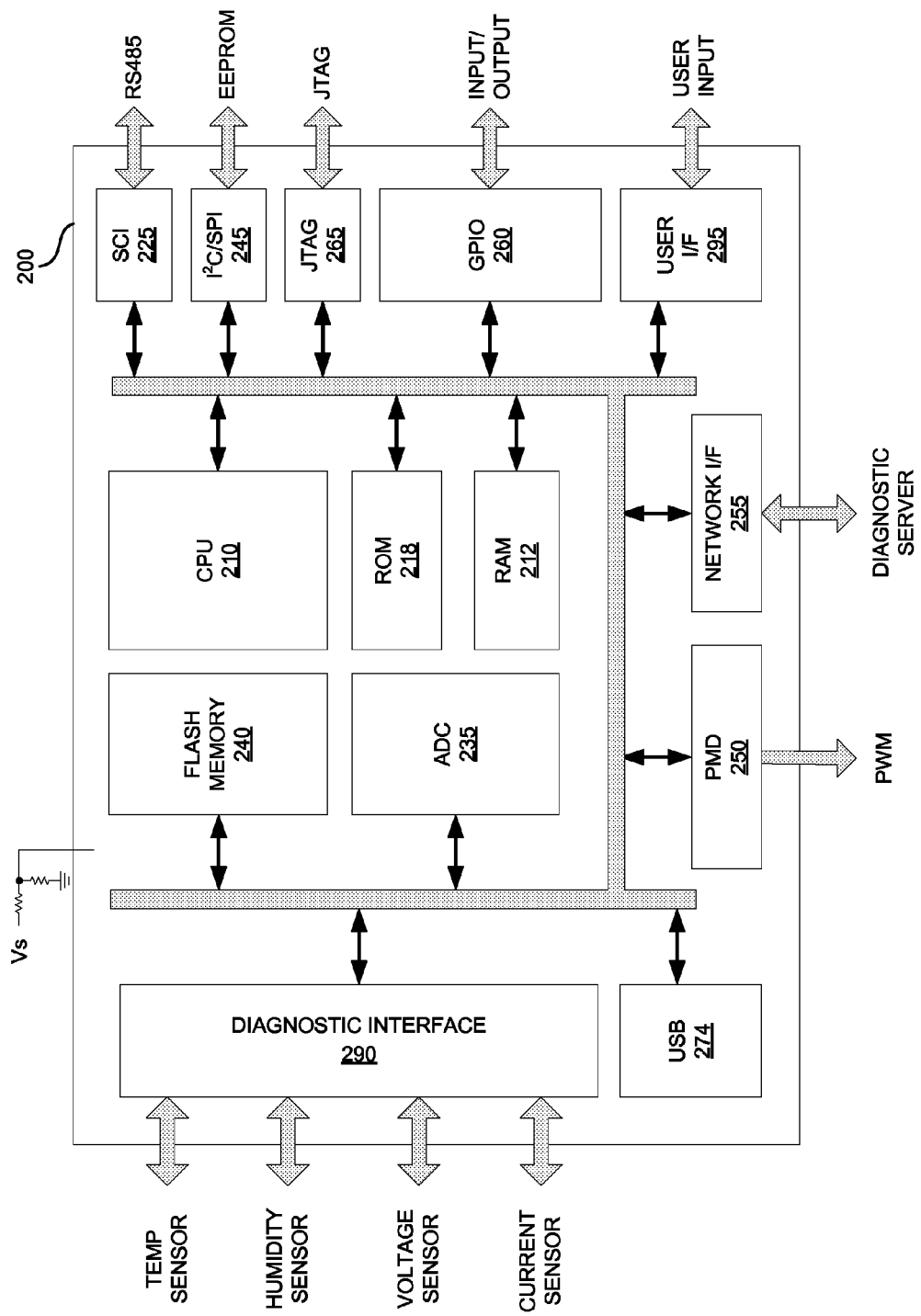
FIG. 2 is a block diagram of an example portable diagnostic module according to one or more aspects described herein.

Portable diagnostic module 120, which is shown in greater detail in FIG. 2, may be configured for use as a microcontroller-based board or computing device within a variety of different drives, systems, devices and other industrial and non-industrial applications and equipment. In at least one embodiment, portable diagnostic module 120 may operate as a standalone unit or device designed to be added to or removed from a larger system environment, such as a drive isolation system 100, without interfering with the original operation or functionalities of that system. For example, as further described below, the diagnostic module may include one or more physical interfaces for receiving input signals emanating from external sensors of a system to which the diagnostic module has been added. The module may reconfigure these physical interfaces to accommodate different types of sensors collecting varying amounts and types of data, thus allowing the module to be removed from one system and inserted into another without disrupting either system.

As described in further detail herein, portable diagnostic module 120 may include multiple channels for communicating with various components internal and/or external to the system in which the diagnostic module is used. For example, as shown in FIG. 1, portable diagnostic module 120 may communicate with any number of sensing devices 110 located throughout the system 100 so as to receive, analyze, and monitor the various parameter measurements obtained by the sensing devices 110. Portable diagnostic module 120 may communicate with such system components and sensing devices through a number of different lines of communication, such as plain wire, telephone line, Ethernet, wireless, cellular, satellite, etc.

In addition to having measurement and communication capabilities associated with electrical properties such as temperature, voltage, current, etc., portable diagnostic module 120 may also be flexible to function according to the particularities of whatever system or systems the module is intended to be used. Different profiles can be used to configure the module to communicate with different suites of sensors used at different locations. For example, some systems may include circuits (e.g., sensing devices 110) designed to detect less-common system properties and operating parameters such as humidity, pressure, PH level, and the like. When used with such systems, portable diagnostic module 120 may be configured with the same capabilities and functionalities as the diagnostic module would have if used with any other system or application. In one or more other arrangements, portable diagnostic module 120 may leverage the existing sensor and circuit framework of the given system in which the module is being used, or simply join in the acquisition of data collected by the devices included in the system. In either arrangement, portable diagnostic module 120 will significantly reduce the hardware requirements of the system while substantially increasing the system's internal visibility.

Because portable diagnostic module 120 may be used with systems that have many different sensors and circuits configured to detect a wide variety of system parameters, properties and operating conditions, in at least one embodiment, such sensors and circuits (e.g., sensing devices 110) can pass their signals to a common diagnostic interface 115, to provide the signals to portable diagnostic module 120. In one arrangement, diagnostic interface 115 is a standardized interface wired to various sensing devices 110 located throughout a system (e.g., drive isolation system 100), and configured to receive all signals generated by sensing devices 110 in response to sensing devices 110 detecting or sensing their respective dedicated parameters or properties. For example, the interface 115 can be a standard 25-pin parallel personal computer interface, and the individual pins can be allocated to different sensors. For example, one system may define data pins 2 and 3 to carry a voltage level provided by a temperature sensing circuit, and pins 4 and 5 to carry a voltage level from a current sensing circuit. A temperature sensing circuit may be configured to provide a voltage output indicating the temperature, and that output can be wired to the appropriate pins in the interface 115. The module 120 can be configured to interpret voltage signals on the temperature sensor's assigned pins as temperature values.

In some embodiments, the interface 115 can be a simple backplane with wiring connections on the sensor/system side, a physical connector (e.g., the 25-pin parallel connector) on the module side, and simple wiring connecting pins of the two. In other arrangements, the interface 115 can include its own processing and/or logic to interpret and/or process signals received from the sensors prior to supplying sensor data to the module. The diagnostic interface 115 can be configured to convert all received signals into a uniform input type compatible with portable diagnostic module 120. Diagnostic interface 115 may be operatively coupled to portable diagnostic module 120, embedded in portable diagnostic module 120, or connected to portable diagnostic module 120. In other arrangements, diagnostic interface 115 may be a component of another part of the system in which portable diagnostic module 120 is used. Similarly, diagnostic interface 115 may standardize sensor signals received from sensing devices 110 in various other ways in addition to or instead of those described herein. In any arrangement, however, diagnostic interface 115 provides flexibility in the measurement and detection capabilities of portable diagnostic module 120, and also enables the module to be easily reconfigurable and portable between multiple different systems and devices.

In one example, diagnostic interface 115 may include a set of satellite circuit boards that may be distributed about various locations in the system. Satellite boards may include sensors or extensions to sensors that function mainly to convert whatever is being sensed or detected into a voltage measurement. For example, a temperature sensing satellite board may include a digital thermometer and an integrated circuit configured to output a voltage based on the temperature detected by the thermometer. Various types of sensors and circuits (e.g., sensing devices 110) may be used to detect one or several operating conditions or parameters (e.g., temperature, current, voltage, humidity, etc.) of a system in which portable diagnostic module 120 is implemented. These sensors, upon detecting the conditions they are configured to detect, output a predetermined voltage range that corresponds to the detected condition and the particular software being utilized within the system. For example, a temperature sensor may be configured to output a DC voltage in the range of 0 V to 5 V to linearly correspond with temperatures ranging from 50° F. to 100° F. As will be described in greater detail below, the portable diagnostic module 120 may be configured to interpret voltage output to certain pins of the interface, and received at the module, as representing a particular operating parameter, property or condition of the system, and further be configured to expect the voltage output to be within a predetermined range. Additionally, the example diagnostic interface 115 described above as a set of satellite circuit boards provides any necessary flexibility in terms of physically connecting portable diagnostic module 120 to the actual detection circuitry and/or sensing devices 110 of the system from which data is to be collected.

As mentioned, in certain arrangements portable diagnostic module 120 may be configured to receive from diagnostic interface 115 only voltage inputs corresponding to operating conditions and properties of the system, as in the illustrative satellite board example above. In such arrangements, the voltages input into the portable diagnostic module 120 for a particular system may carry one or more meanings defined by the software implemented in that system. For example, while pins 7 and 8 of the portable diagnostic module may measure DC bus voltage for one system, if the module is instead implemented in a second system, such as an uninterruptible power system (UPS), those pins may instead measure some current or outer voltage. In other words, the same physical pins of the interface may be retasked and used for different sensing purposes.

FIG. 2 is a block diagram of an example portable diagnostic module (e.g., portable diagnostic module 120 illustrated in FIG. 1). As illustrated in FIG. 2, portable diagnostic module 200 may include various hardware, such as processor unit 210 for controlling overall operation of the module and its associated components, including RAM 212, ROM 218, FLASH Memory 240, Analog-to-Digital (A/D) Converter 235, Programmable Motor Driver (PMD) 250, General Purpose Input/Out (GPIO) channels 260, Diagnostic Interface (I/F) 290, User I/F 295 and Network I/F 255. Processor unit 210 may include or operate with one or more computer-readable media, such as FLASH memory 240, storing instructions that cause portable diagnostic module 200 to perform the various steps and functions described herein. For example, FLASH memory 240 may store software executed by processor unit 210, such as an operating system, application programs, and associated databases (not shown).

As shown in FIG. 2, and described in greater detail herein, portable diagnostic module 200 may include a diagnostic interface 290 for receiving sensor data from various sensing devices such as temperature, humidity, voltage, and current sensors. Diagnostic interface 290 may include its own processing and/or logic (not shown) to interpret and/or process signals received from the sensors (e.g., temperature, humidity, voltage, current, etc.) prior to supplying sensor data to the module. In some arrangements, diagnostic interface 290 may be configured to convert all received signals from the sensors into a uniform input type compatible with portable diagnostic module 200. Although shown in FIG. 2 as an embedded component of portable diagnostic module 200, as described above (e.g., with respect to diagnostic interface 115 shown in FIG. 1), diagnostic interface 290 may alternatively be a simple backplane with wiring connections on the sensor/system side, a physical connector (e.g., the 25-pin parallel connector) on the module side, and wiring connecting the pins of each. In other arrangements, diagnostic interface 290 may be operatively coupled to portable diagnostic module 200, or connected to portable diagnostic module 200 in ways other than those described above.

Also shown in FIG. 2, portable diagnostic module 200 may include multiple communication ports or channels for communicating with various components internal and/or external to the system or drive in which the module is used. In at least one arrangement, portable diagnostic module 200 may include a debugging port 265 configured for communication with Joint Test Action Group (JTAG) for system programming and debugging, a SCI port 225 for RS485 communication with the rest of the system, and a I²C/SPI port 245 for a serial external EEPROM interface. As described in greater detail herein, portable diagnostic module 200 may, in some arrangements, include a network I/F 255 for communication over one or more devices, such as servers of the attached system, servers remotely located from the diagnostic module, other networked diagnostic modules, etc. For example, portable diagnostic module 200 may communicate with a remote server over a network in which numerous other diagnostic modules are connected. Such network communications may allow portable diagnostic module 200 to perform various updating and analysis functions, store sensor data at a remote location, communicate received sensor data to other devices and/or modules, and the like. The various network connections and capabilities of portable diagnostic module 200 are shown in greater detail in FIG. 3.

Portable diagnostic module 200 may also be configured with a User I/F 295 to provide a user of diagnostic module 200 with various input capabilities. For example, user I/F 295 may include a video output interface to provide a visual user interface, audio output interface, keyboard/mouse/touch-screen input, etc. The user may use this interface to inform the module of the system to which it is attached, and to inform it of the sensors to be monitored. The diagnostic module 200 may download or otherwise retrieve appropriate diagnostic settings for the system based on this input. In another arrangement, user I/F 295 may be configured to allow a user to manually input diagnostic settings for the system or download to the diagnostic module a configuration file for the system. A configuration file may include, for example, voltage ranges to be assigned to sensor input pins of the diagnostic module, fault or trip levels for the sensors used in the system, and measurement data acquisition and recording settings, which may determine the frequency diagnostic module 200 collects and stores data from attached sensors, the duration of such data collection, one or more levels of detail to which diagnostic module 200 is to record measurement data obtained, and other similar parameters.

User I/F 295 may also allow portable diagnostic module 200 to be configured to acquire and/or record data measured by the various sensing devices in different modes. In one mode the module may record measured data continuously from the time the module is connected or plugged-in to the system. A variation on this mode may be that module records data continuously, but the continuous recording does not begin until a certain triggering event occurs, such as a fault detected in one of the system's components. In another mode, the module may record measured data at select time intervals, with such time intervals varying between the different sensors attached to the module. In yet another mode, the diagnostic module may be configured to record certain types and amounts of measured data on a continuous basis and then record additional types and amounts of data immediately before and after a certain event occurs. For example, the module may predict, based on the measured data continuously recorded, that a certain event (e.g., a system fault) is about to occur, in which case the module may begin recording additional and/or different data so as to provide more detail surrounding the event. This increased level of recording may continue for a predetermined amount of time following the event to monitor the system's reaction.

In one or more arrangements portable diagnostic module 200 may also have numerous output capabilities, including outputs for managing auxiliary systems and components within a drive or larger system environment. For example, portable diagnostic module 200 may include hardware for providing various motor control functions, such as circuitry to control operation of a system load, such as slowing a motor down if excessive temperatures are detected.

The portable diagnostic module 200 may also include multiple GPIO channels 260 for managing various auxiliary systems and components within the larger system or drive. For example, one or more GPIO pins 260 of portable diagnostic module 200 may be configured by software stored in FLASH memory 240 as output pins, as input pins, or as bidirectional peripheral alternate function pins. In one arrangement, GPIO pins 260 may be toggled between different digital and analog alternate functions, while in another arrangement, such alternate function configurations of GPIO channels 260 may be locked if necessary.

Portable diagnostic module 200 may also be configured to perform various measurement, recording, prediction, calculation and reporting functions so as to provide a particular system with significantly greater assessment and diagnostic capabilities. For example, if the temperature of a motor (e.g., motor 102 illustrated in FIG. 1) exceeds some predetermined threshold during operation, portable diagnostic module 200 may record (e.g., in FLASH memory 240) various details related to the occurrence, such as other operating conditions existing at the time, the precise location on or within the motor or the motor's components, or within the motor's operating environment, where the high temperature was sensed (e.g., the location of the particular temperature sensor), the actual value of the sensed motor temperature along with the threshold temperature that was set at the time, and other similar information specific to the event, as well as these same measurements over different time periods. These and other specific capabilities of the portable diagnostic module will be described in greater detail below.

Figure 3:
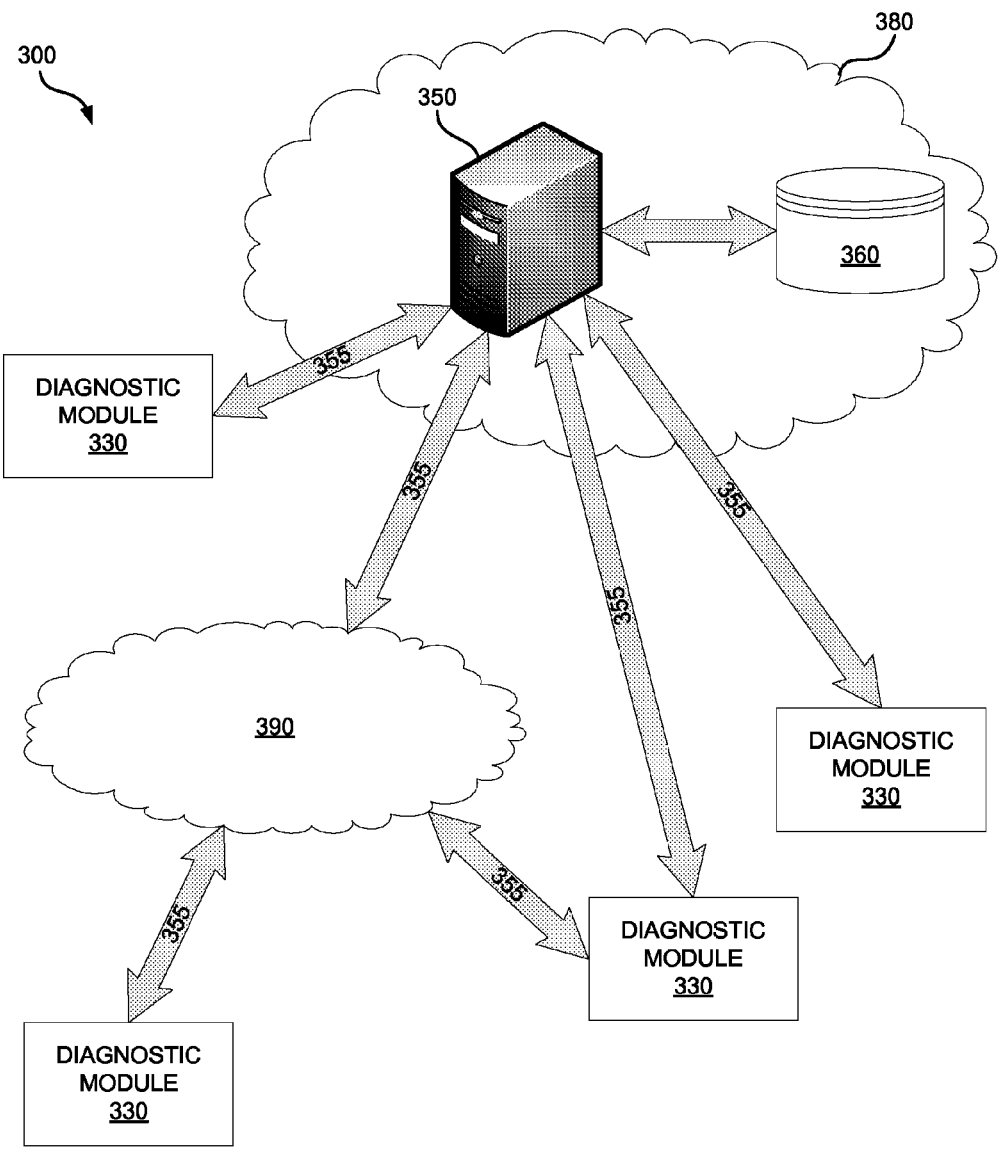
FIG. 3 illustrates an example network environment in which a portable diagnostic module may be remotely updated and reconfigured according to one or more aspects described herein.

FIG. 3 illustrates an example network environment in which a portable diagnostic module may operate according to various aspects described herein. As shown, network environment 300 may support connections between one or more portable diagnostic modules 330 (e.g., modules 200 located at different places in a factory, or at different factories around the country) and a remote diagnostic server 350. Diagnostic server 350 may be any of a variety of remote computers, servers, data processors, terminals, or any combination of any of the same, and may be connected to a database 360 in which data may be stored and from which data may be retrieved by diagnostic server 350. For example, diagnostic server 350 may maintain in database 360 measurement data collected from various systems and devices by portable diagnostic modules 330 and then transmitted by the diagnostic module to diagnostic server 350 for analysis and/or storage. As described in greater detail below, portable diagnostic module 330 may be reconfigurable across different systems such that before the module is removed from a first system and connected to a second, any data collected from the first system by the portable diagnostic module 330 may be uploaded to diagnostic server 350 for storage in database 360. The portable module 330 can also load different configuration parameters, based on the different sensors to be used at the new location.

The various network connections shown in FIG. 3 include communications between portable diagnostic modules 330 and diagnostic server 350 via network 380. Network 380 may be any suitable network for supporting connections between portable diagnostic modules 330 and diagnostic server 350, including the Internet, an intranet, a wide-area network (WAN), a local-area network (LAN), a wired or wireless network, a digital subscriber line (DSL) network, a frame relay network, an asynchronous transfer mode (ATM) network, a virtual private network (VPN), or any combination of any of the same.

Portable diagnostic module 330 may be connected to diagnostic server 350 through a network interface or adapter included in portable diagnostic module 330, such as network I/F 255 illustrated in FIG. 2. In other networking environments, portable diagnostic module 330 may include a modem or other similar network interface for establishing communications with diagnostic server 350 over network 390, which may be any suitable network similar to network 380 described above. Communications links 355 may be any communications links suitable for communicating between diagnostic module 330 and diagnostic server 350, such as network links, dial-up links, wireless links, hard-wired links, etc. It will be appreciated that the network connections shown in FIG. 3 are illustrative and other means of establishing a communications link between portable diagnostic module 330 and remote diagnostic server 350 may be used, including the use of various protocols such as TCP/IP, Ethernet, FTP, HTTP, HTTPS, SIP and the like.

As will be described in greater detail below, the exemplary network arrangement shown in FIG. 3 provides for the ability to remotely upgrade, reconfigure, and communicate with the portable diagnostic module. Furthermore, in one or more embodiments, data collected by portable diagnostic modules 330 may be analyzed and/or stored at remote diagnostic server 350, thus minimizing the storage and processing requirements of portable diagnostic modules 330 and allowing the modules to maintain their portability and flexible reconfiguration properties.

Figure 4A:
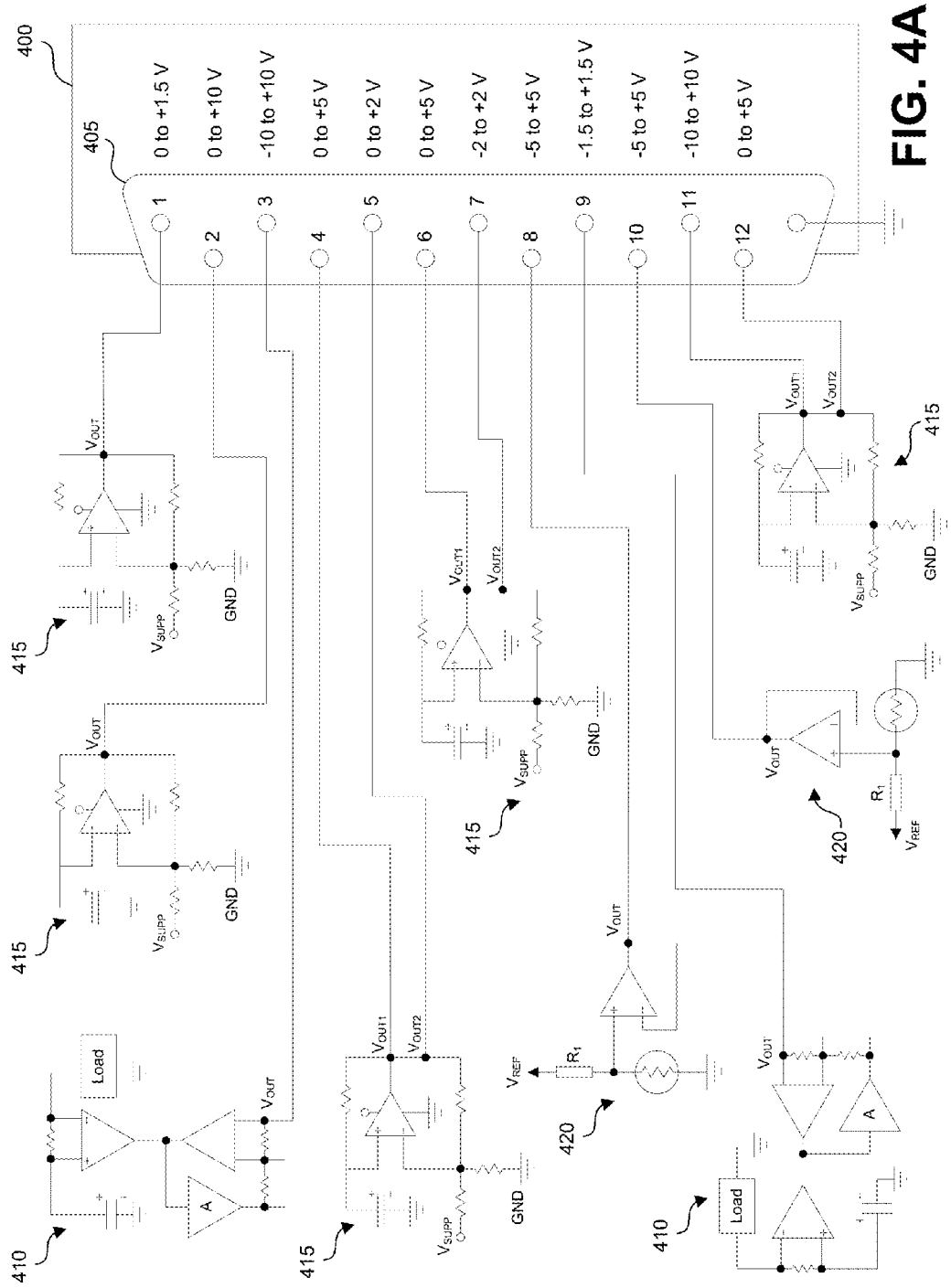
FIG. 4A is a schematic diagram of an example standardized interface of a portable diagnostic module showing a configuration of pin assignments according to one or more aspects described herein.
Figure 4B:
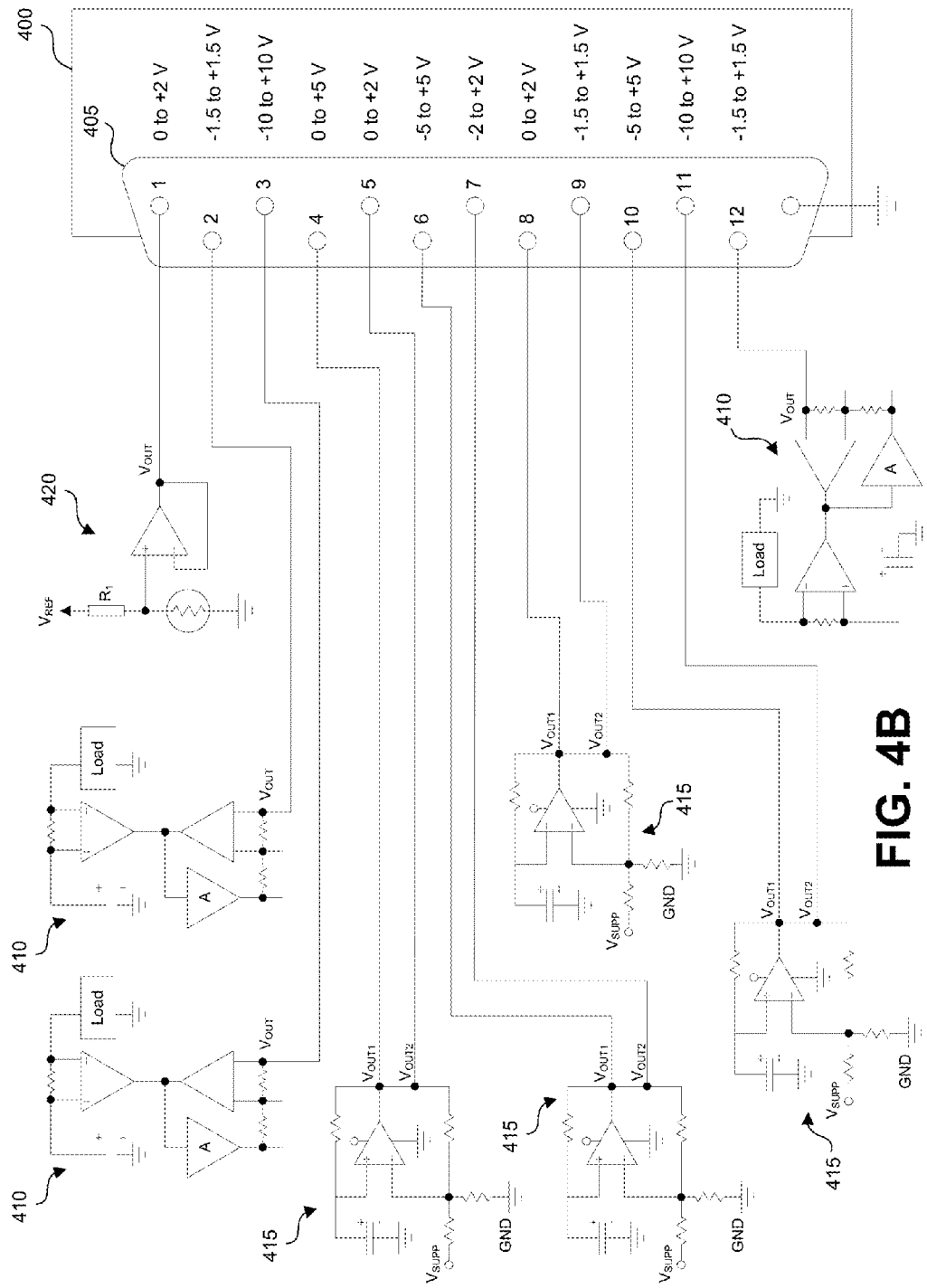
FIG. 4B is a schematic diagram of an example standardized interface of a portable diagnostic module showing a configuration of pin assignments according to one or more aspects described herein.
Figure 4C:
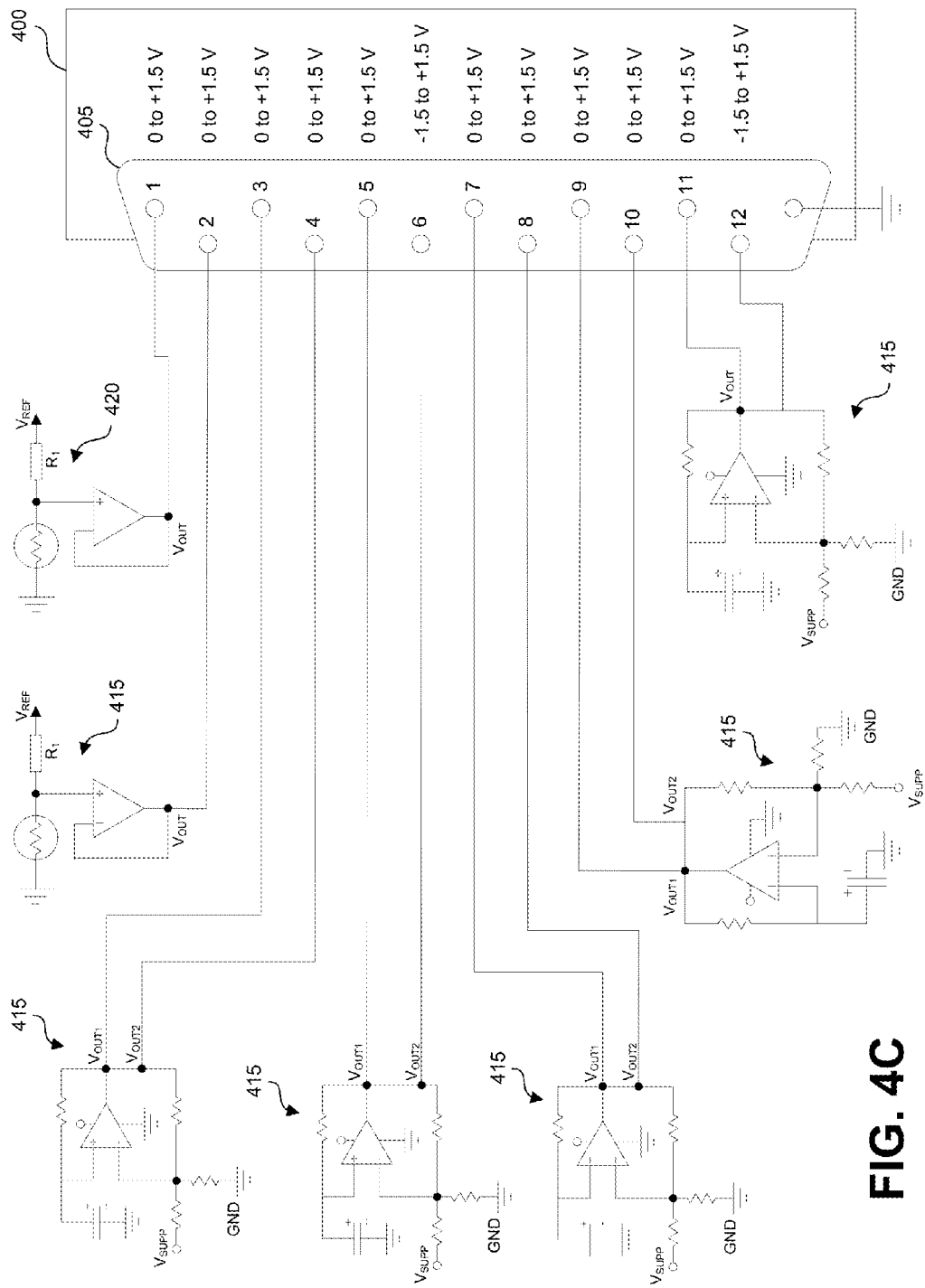
FIG. 4C is a schematic diagram of an example standardized interface of a portable diagnostic module showing a configuration of pin assignments according to one or more aspects described herein.

FIGS. 4A though 4C are example configurations of the portable diagnostic module showing different pin arrangements of the diagnostic interface (e.g., diagnostic interface 115 shown in FIG. 1) of the module and wiring connections to various sensors (e.g., sensing devices 110 shown in FIG. 1) of the system to which the portable diagnostic module is attached. As will be described in greater detail below, FIGS. 4A through 4C illustrate how portable diagnostic module 400 may be reconfigured according to the particular types of sensors being used within a system. In one arrangement, the pins of diagnostic interface 405 of portable diagnostic module 400 may be configured to expect voltage inputs within the example ranges shown in FIG. 4A, where the sensor environment of the system may include current sensors 410, temperature sensors 415 and 420, voltage sensors. When portable diagnostic module 400 is removed from the system with the sensor environment shown in FIG. 4A, and attached instead to a system with sensor arrangements such as those shown in FIGS. 4B and 4C, the pins of diagnostic interface 405 may be reconfigured with new voltage range expectancies. The example interface may be analog (e.g., voltages between predetermined pins may vary proportionally to the measured quantity) or digital (e.g., pins can simply carry digital numeric values corresponding to the measured quantity, where an analog-to-digital conversion circuit can be used to convert a measured quantity into a digital numeric value).

Also shown in FIGS. 4A through 4C are example circuit arrangements representing current sensors 410, RTDs 415 and thermistors 420. The circuits shown in FIG. 4A through 4C as representing current sensors 410, temperature sensors 415 and 420, voltage sensors 425, and pressure sensors 430 are not intended to limit the type or number of such sensors that may be used with the portable diagnostic module described herein. Rather such circuits are included in FIGS. 4A through 4C for purposes of illustrating that, in at least one arrangement, the sensors used with portable diagnostic module 400 each output a voltage that may be linearly related to the particular electrical property sensed by that sensor. For example, in one system current sensors 410 may be one or more shunt resistors, Hall Effect sensors and/or current transformers, while in another system current sensors 410 may all be of the same type. In other example embodiments, the various sensors can simply output a digital value for its output. For example, a digital temperature sensor could output a timed sequence of bits, indicating a digital value of the temperature.

Figure 5:
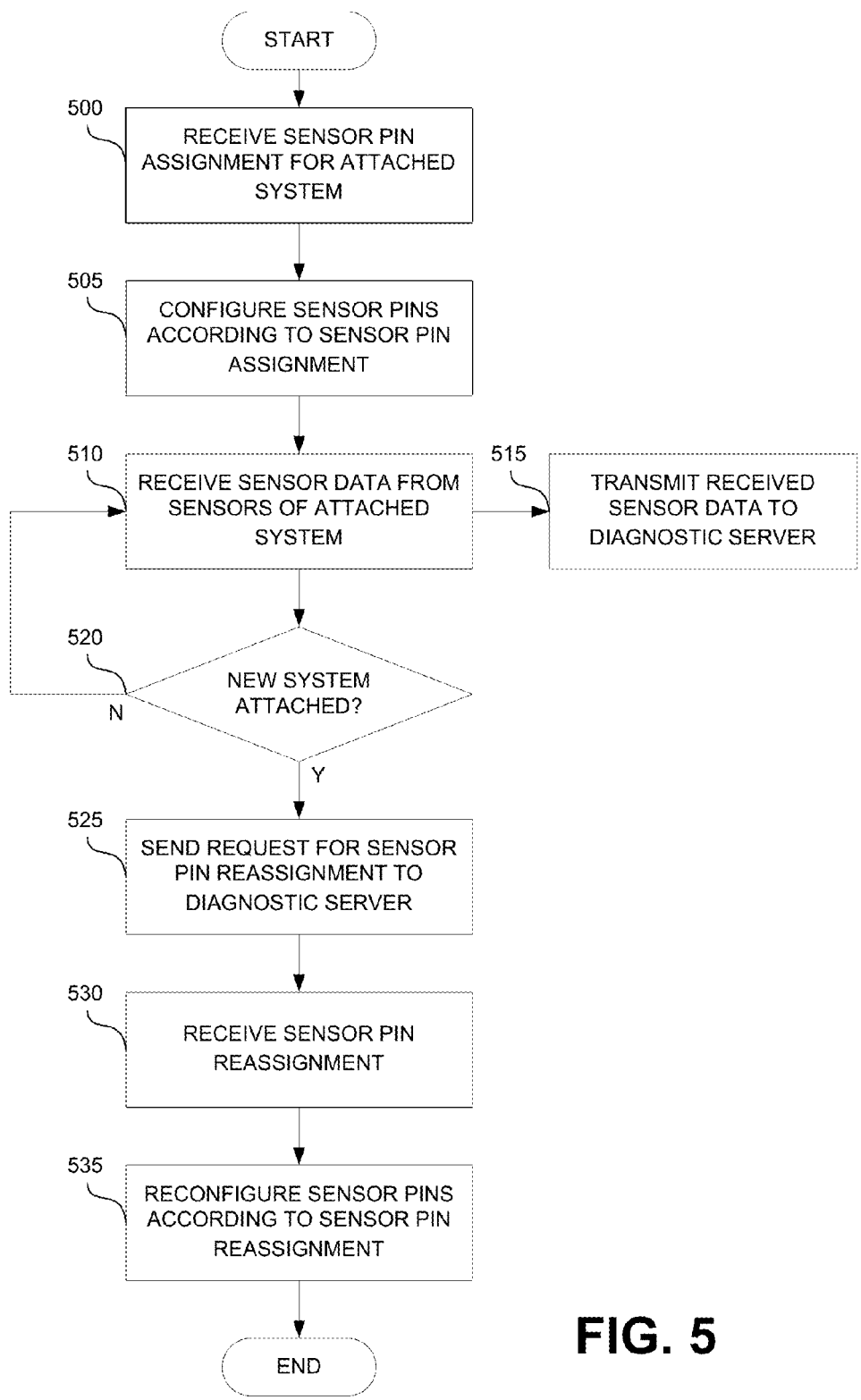
FIG. 5 is a flowchart illustrating an example method for reconfiguring a portable diagnostic module for use with a particular system according to one or more aspects described herein.

FIG. 5 is a flowchart illustrating an example method of reconfiguring a portable diagnostic module (e.g., portable diagnostic module 330 shown in FIG. 3) for use within a particular system. In some embodiments, the portable diagnostic module may be removed from a first system (e.g., drive isolation system 100 illustrated in FIG. 1) and connected to a second system, allowing the same diagnostic module to be used at a plurality of locations. Additionally, the measurement, detection, output and diagnostic capabilities of the portable diagnostic module can be reconfigured during such a transition between systems. When the portable diagnostic module is attached to a system, the module can be reconfigured as needed to complement the specific characteristics and particularities of the system and the system's operating environment. Similarly, while the portable diagnostic module is attached to a system, the module may also be reconfigured as needed to adapt to changes in the attached system's environment that affect the system's operations. In this manner, the portable diagnostic module maintains flexibility to ensure that its various measurement and diagnostic capabilities do not diminish as a result of normal system fluctuations.

Because of its portability across systems of all different sizes, complexities, conditions, and applications, the diagnostic module may, in some arrangements, be preconfigured with pin assignments specific to a certain system before the module is actually attached to that system. Alternatively, the diagnostic module may be programmed with certain pin assignments via a user interface (e.g., User I/F 295 shown in FIG. 2) once the module is attached to a system. For example, if the diagnostic module is intended to be used in a relatively old system comprised of components nearing the end of their useful life and operating below optimal performance, it may be preferable to preconfigure the module with settings specific to the system since it may be possible that, in the event the system is plagued by failures, the module is unable to be accurately reconfigured with its full capabilities. For example, the diagnostic module can receive different sensor parameters for the older equipment. An older machine may run slower, louder, and/or hotter than a newer machine, or may draw more current than a more efficient newer machine, so the diagnostic module can be configured to expect sensor readings in the slower/louder/hotter/higher current range. The new configuration can vary for other reasons as well. For example, if a given installation has different types of sensors providing different outputs, the diagnostic module can be reconfigured to accept different sensor inputs (e.g., different expected voltage ranges, or different digital data) at the sensor interface, and can interpret them differently (e.g., voltages at pins 2 and 3 can refer to digital bits with 3 V high, instead of an analog voltage at each pin).

The process illustrated in FIG. 5 begins at step 500 with the portable diagnostic module receiving a sensor pin assignment for the system to which the module is attached. As mentioned, a particular system may have a certain arrangement of sensors, and these sensors may be configured to output a voltage that corresponds (e.g., linearly corresponds) to a measured electrical property, such as temperature, current, humidity, etc. The diagnostic module may receive the sensor pin assignment in any number of different ways. For example, referring to FIG. 2, the diagnostic module may, after being attached to the system, receive a pin assignment by a user inputting such through, for example, User I/F 295. In another arrangement, the diagnostic module may receive an initial pin assignment by communicating with various devices (e.g., servers) external to the system and module through Network I/F 255. In yet another arrangement, the diagnostic module may receive a pin assignment through communications with other components of the attached system, such a microcontroller or microprocessor, which may send the diagnostic module the pin assignment via RS485 signals received through SCI port 225. In step 505, the diagnostic module may use the pin assignment received in step 500 to configure the sensor pins of its diagnostic interface (e.g., sensor pins 1-12 of diagnostic interface 405 shown in FIGS. 4A through 4C) to receive sensor data from the various sensors of the attached system (e.g., sensors 410, 415 and 420 shown in FIGS. 4A through 4C).

Once the sensor pins of the diagnostic module are configured according to the received pin assignment, the diagnostic module may, in step 510, begin receiving sensor data from the various sensors of the attached system. As described above, and illustrated in FIGS. 4A through 4C, the pins of the diagnostic interface (e.g., pins 1-12 of diagnostic interface 405) may each be configured to expect a certain voltage range output from the sensors of the attached system. In at least one arrangement, any such sensor data received by the diagnostic module in step 510 may be transmitted by the module in step 515 to a diagnostic server (e.g., diagnostic server 350 shown in FIG. 3) remotely located from both the module and attached system, but in communication with the module over a network. The sensor data may be transmitted by the module to the remote diagnostic server for numerous reasons, such as storage, analysis, relay transmission to other network components, etc. For example, the diagnostic module may transmit sensor data to the remote diagnostic server to determine whether the data conforms with data collected from similar types of systems operating under similar conditions, and if not, what remedial steps should be taken with respect to the attached system.

In step 520, the diagnostic module determines whether it has been attached to a new system. For example, given the portability of the diagnostic module, the module may be removed from one system in one location and reinserted into another different system in a different location. Accordingly, the diagnostic module may be configured to detect a new system in which case the module In step 525, the diagnostic module may send a request for a pin reassignment to the diagnostic server after determining that a new system is attached and thus the current pin assignment is no longer appropriate. In one arrangement, the diagnostic module may transmit a pin reassignment request to the diagnostic server that includes a request for additional information about the new system attached. For example, the diagnostic module may, upon being relocated and attached to a new system, request the diagnostic server to send a pin reassignment for the new system along with any previously recorded sensor data, fault levels, event history, etc., for the new system, so that the diagnostic module may perform various diagnostic functions before reconfiguring its sensor pins in step 535. In step 530, the module receives from the diagnostic server the requested pin reassignment for the new system attached.

The pin reassignment received from the diagnostic server in step 530 may change how the diagnostic module will receive and interpret the signals received from the sensors. For example, if the module is being moved from a lower voltage motor drive system to a higher voltage one, then new trip levels can be provide to inform the module that expected voltage values will be higher. If the module is being moved to a system that has a different kind of sensor wired to predetermined pins (e.g., pins 7 and 8 carry signals from a thermometer, instead of a voltage sensor), then the new pin configuration and use can be provided to the module.

In addition to the portable diagnostic module being reconfigured with new trip levels and operating thresholds through communications with the remote diagnostic server, as described above, in one or more embodiments the portable diagnostic module may also receive updated information and measurement data about a system to which it is attached. Configuring the portable diagnostic module to include such capabilities not only provides an attached system with greater awareness of repeated or rapid changes to its environment, but also helps to reduce the possibility of erroneous detection of system failures or potentially hazardous conditions since the portable diagnostic module does not operate with outdated information. For example, the downloaded information can indicate that the motor at this facility tends to run hot, or that the manufacturer of the motor has updated its guidelines for the motor, allowing for a higher temperature operation. Furthermore, updating the portable diagnostic module in a remote manner such as that described herein reduces the memory and processing requirements of the module and thus enhances the module's effectiveness and efficiency, ultimately benefiting the particular system in which the module is being used.

Figure 6:
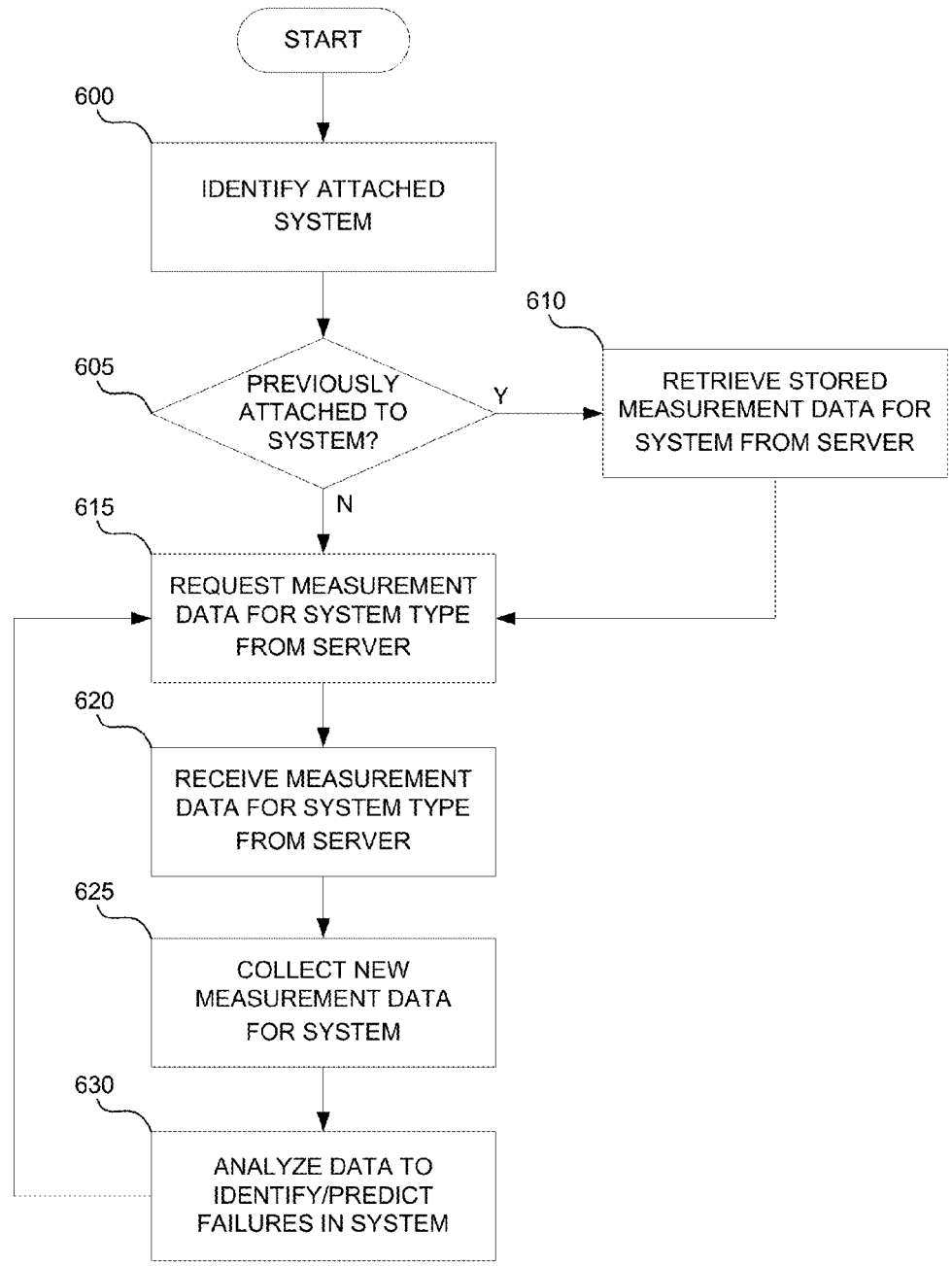
FIG. 6 is a flowchart illustrating an example method for remotely updating a portable diagnostic module with system specific data according to one or more aspects described herein.

FIG. 6 is a flowchart illustrating an example method of remotely updating a portable diagnostic module (e.g., portable diagnostic module 330 shown in FIG. 3) with data and information specific to the system or device to which the portable diagnostic module is attached. In one arrangement, communications between the portable diagnostic module and a remote diagnostic server (e.g., diagnostic server 350 shown in FIG. 3) may be utilized to update the portable diagnostic module with new measurement data, event history, profile changes, and other such information for the attached system. Additionally, the portable diagnostic module may use the remote diagnostic server as a database for maintaining a history of various system occurrences, including system failures, faults, alarms, and corresponding measurement data related to such occurrences. In one or more arrangements, remote updates from the diagnostic server may derive from analyses conducted by the diagnostic server on data previously collected from the portable diagnostic module and/or data collected and compiled from other diagnostic modules being used within similar types of systems also connected to the diagnostic server via the same network (e.g., the arrangement of portable diagnostic modules 330, diagnostic server 350 and network 380 as shown in FIG. 3).

The process illustrated in FIG. 6 begins at step 600 with the portable diagnostic module identifying the system (or device, drive, application, etc.) to which the module is attached. Although the diagnostic module may identify the attached system in any number of different ways, this identification step may be performed in a similar manner as step 500 of the process described above and illustrated in FIG. 5. For example, the diagnostic module may, after being attached to the system, receive user input via a user interface (e.g., User I/F 295 shown in FIG. 2) that identifies the attached system to the module. Similarly, the diagnostic module may also communicate with one or more remote servers (e.g., diagnostic server 350 shown in FIG. 3) to determine the specifics about the system attached.

In step 605, the diagnostic module determines whether it has previously attached to the system identified in step 600. In one arrangement, the diagnostic module may determine whether it has attached to the system before by accessing one or more of its memory components (e.g., ROM 218, FLASH memory 240, etc.) for data previously collected from the system by the diagnostic module and stored thereon. In another arrangement, where instead of storing collected data in its internal memory the diagnostic module uploads the data to a networked diagnostic server (e.g., diagnostic server 350 illustrated in FIG. 3), the diagnostic module may determine whether it has attached to the system before by determining whether the diagnostic server has data stored about the system that was previously uploaded by the module. If the diagnostic module determines in step 605 that it has previously worked with the system, then in step 610 the module retrieves from the diagnostic server any stored measurement data about the system. For example, the diagnostic module may retrieve from the diagnostic server any measurement data about the system that may have been collected by the module the last time the module was attached to the system. In one arrangement, the measurement data retrieved by the diagnostic module in step 610 may be identical to the data previously uploaded to the server by the module, or, in other arrangements, the measurement data may be data that has been processed or analyzed by the server in one or more ways. Following step 610, the process continues to step 615, which is further described below.

If the diagnostic module determines in step 605 that it has not previously attached to the system identified in step 600, then the process proceeds to step 615 where the diagnostic module requests from the diagnostic server measurement data for the type of system that is attached, which the module then receives from the server in step 620. In some arrangements, measurement data for the type of system attached is data that has been collected by the diagnostic server from numerous other networked diagnostic modules attached to other systems of the same or similar type. The diagnostic server may have analyzed the data about other systems of the same type such that in step 620, the diagnostic module receives measurement data that, although not specific to the system currently attached, is nonetheless still applicable to the system. For example, systems of the same type operating under comparable circumstances may experience substantially similar events and/or failures after being in use for approximately the same time. Thus, in step 620 the diagnostic module may obtain such information about one or more similar systems, which may be factored into the evaluation of the system attached along with new measurement data collected by the module in step 625.

The diagnostic module may be configured to receive multiple input measurements, including, for example, electrical properties, operating parameters and other conditions of the system detected by one or more sensors (e.g., sensing devices 110 illustrated in FIG. 1) at various locations throughout the system environment. In step 625, the diagnostic module may collect such measurement inputs as they are detected by the system's sensing devices, the detected measurements all being received in a standardized interface where the data may be converted to a uniform format for analysis and storage by the diagnostic module in step 630. According to aspects described in greater detail below, the diagnostic module may, in step 630, analyze the data collected in step 625 together with the data received from the diagnostic server in step 620 to determine whether one or more failure are present in the attached system and/or predict whether one or more failures may occur in the near future.

As indicated by the iterative loop from step 630 to step 615 shown in FIG. 6, in some embodiments the portable diagnostic may repeatedly receive updated system type information while also gathering new measurement data for the specific system attached. In this manner, the diagnostic module has predictive capabilities that involve using historical data for an attached system to identify trends in the system's operations, failures, and the like, and then using such trending information to predict when certain events related to the system and/or its components may occur. In some instances, trending information gathered from a particular data set may not be sufficiently developed to generate predictions within a degree of accuracy that is useful to the diagnostic module. Accordingly, the portable diagnostic module's predicting capabilities may also include monitoring and updating early-stage trending data until such data does become useful in generating predictions. For example, the bearings of many industrial cooling fans typically need to be replaced after approximately five years of use. In accordance with its predicting capabilities, the portable diagnostic module may track and monitor runtime and/or airflow data collected for a cooling fan currently in use, and using this data, predict that the bearings of the cooling fan will likely fail in approximately six months. It can also be reconfigured/calibrated as the unit nears its five-year anniversary, to account for (and allow) decreased performance, or to monitor status more frequently, or to take enhanced precautionary measures in anticipation of a failure. This predicting ability of the portable diagnostic module allows remedial action to be taken in advance of potential, yet likely, system failures actually occurring, and thus protects against unexpected failures and other such events.

Figure 7:
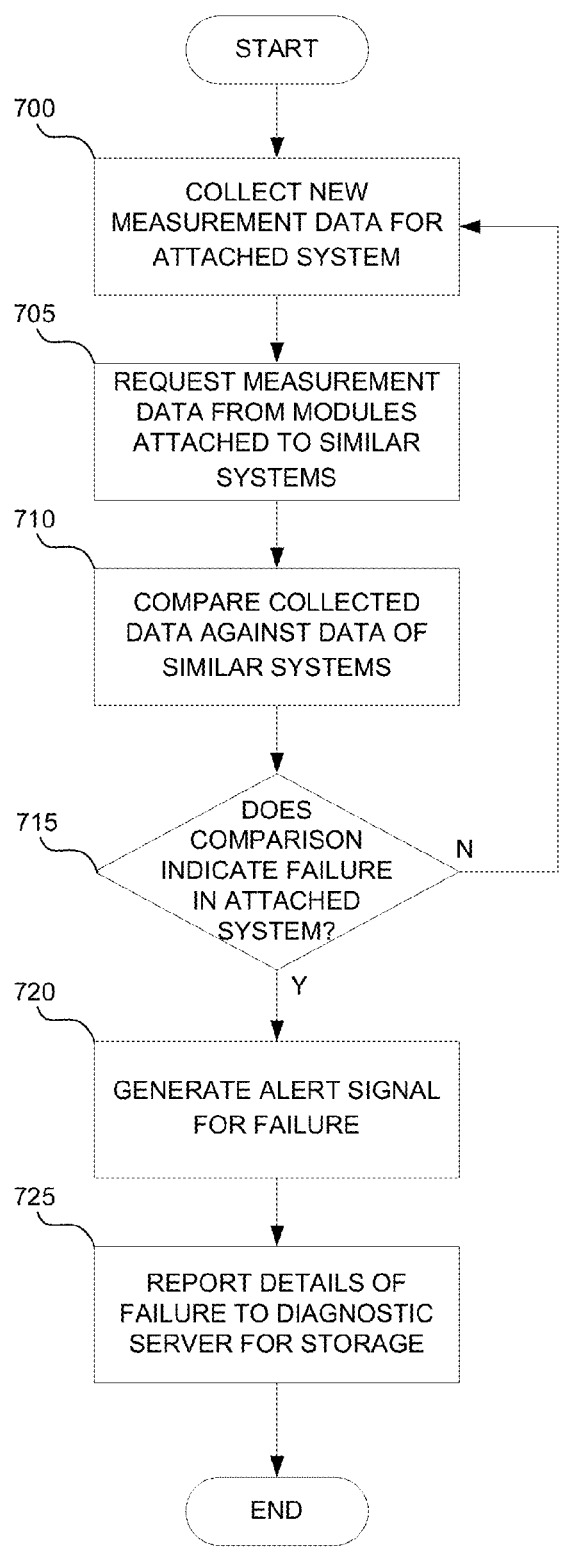
FIG. 7 is a flowchart illustrating an example method for evaluating and monitoring a system by using data collected from similar systems by portable diagnostic modules in communication with one another over a network according to one or more aspects described herein.

In some configurations, the diagnostic module may receive configuration (e.g., sensor type, trip values, etc.) from a remote server, and may use that configuration data to locally receive sensor readings and determine if a failure has occurred (or is imminent). In other embodiments, a diagnostic module may seek to compare its own measured values with those measured by other diagnostic modules. FIG. 7 illustrates a method for evaluating and monitoring a system based on a comparison of data collected from the system with data collected from similar systems by portable diagnostic modules in communication with one another over a network (e.g., network 390 illustrated in FIG. 3). In one or more embodiments, multiple portable diagnostic modules may be attached to systems of the same or similar type implemented as separate parts of a larger overall system, or implemented in different physical locations altogether. For example, each of three portable diagnostic modules may be attached to substantially similar propulsion and auxiliary power systems being used in three different light-rail vehicles operating in different geographical regions. These three modules may communicate with one another to exchange diagnostic data collected and analyses performed so that each may conduct a more comprehensive assessment of its respective power system. This comparison and assessment process is described in greater detail below.

The process illustrated in FIG. 7 begins at step 700 with a portable diagnostic module collecting new measurement data for a system to which it is attached. For example, as described above with respect to the process illustrated in FIG. 6, the diagnostic module may receive various input measurements from sensor devices located throughout the attached system, including inputs related to detected electrical properties and operating parameters of the system. In some arrangements, the system to which the portable diagnostic module is attached may be extremely complex and include a substantial number of interconnected components and operating parts. In such instances, the diagnostic module may, in step 705, request measurement data (e.g., expected parameters, actual measured values, etc.) from one or more other portable diagnostic modules attached to systems of the same or similar type. Requesting measurement data from other diagnostic modules may be accomplished in a number of different ways, including via a network through which all of the diagnostic modules may communicate (e.g., network 390 shown in FIG. 3). In one or more arrangements, the portable diagnostic modules may communicate requests for measurement data from other diagnostic modules to a diagnostic server, such as diagnostic server 350 illustrated in FIG. 3. The diagnostic server, upon receiving the request for measurement data from a particular diagnostic module, may determine the type of system attached to the requesting diagnostic module and, based on that determination, direct the request to one or more other diagnostic modules attached to similar systems. These one or more other diagnostic modules may, in response to receiving the directed request from the diagnostic server, send measurement data back to the requesting diagnostic module once again via the diagnostic server.

In other arrangements, the diagnostic server may have the requested measurement data stored in a database of the diagnostic server (e.g., database 360 shown in FIG. 3), and therefore might not need to relay the request to the other diagnostic modules, but instead may simply send back the stored data to the requesting module. In a situation where the measurement data stored by the diagnostic server is not current as of the time of the request, the diagnostic server may, in one or more embodiments, collect the most recent measurement data from the other diagnostic modules, compile the collected data with the stored data, and then pass the compiled measurement data back to the requesting diagnostic server. It should be understood that numerous other arrangements, in addition to or instead of those described above, may also be implemented to fulfill requests from a diagnostic module for measurement data from other diagnostic modules attached to systems of the same or similar type.

Returning to FIG. 7, after requesting measurement data from other diagnostic modules in step 705, the process continues to step 710 where the diagnostic module compares the measurement data from the other similar systems against the data collected by the diagnostic module from the specific system attached. The comparison conducted by the diagnostic module in step 710 may be comprised of any of a variety of different assessment and evaluative methods that provide some indication of how the attached system is functioning in comparison to other similar systems also in operation. The comparison may involve, for example, determining statistical average and range for measured parameters from the various other systems, to determine whether the current system's measured values are similar to those measured at other locations.

In at least one arrangement, before performing the comparison in step 710, the diagnostic module may request and receive from the diagnostic server information about any environmental differences between the attached system and the other systems from which the measurement data was requested. Such information about existing differences between the systems may need to be factored in to or otherwise considered with the comparison of step 710 so that any results and/or conclusions drawn from the comparison are accurate and reliable with respect to the attached system. For example, if one system is installed at a colder climate than another, then the colder-climate diagnostic module may wish to calibrate its temperature trip values to account for the lower average temperature.

In step 715, the diagnostic module determines whether the comparison of the data collected from the attached system and the measurement data requested from the diagnostic modules attached to similar systems indicates the existence and/or potential of one or more failures in the attached system by exceeding statistically normal ranges from other systems. If not, then the process repeats back to step 700 with new measurement data being obtained by the diagnostic server from the attached system. However, if, in step 715, the diagnostic server determines that potential for one or more failures does exist, or that a failure is already present in the attached system, then in step 720, the diagnostic module may generate an alert signal indicating such. Furthermore, in at least one embodiment, in step 725 the diagnostic server may report the details of the failure and/or potential failure in the attached system to the diagnostic server for storage and further analysis.

The various features, examples and embodiments described above are not intended to limit the scope of the present application, and many of the components may be divided, combined and/or subcombined with one another as desired. Additionally, the numeric values discussed herein (e.g., referring to I/O channels, supply voltage, etc.) represent exemplary values, and engineering tolerances will necessarily cause some implementations to deviate from the numbers used—any such values appearing herein should be read with an understanding that such engineering tolerance deviations may (and will) occur. Accordingly, the scope of the present patent should only be defined by the following claims.

We claim the following:

1. A method, comprising:
receiving at a diagnostic module having an interface with a plurality of sensor pins, a sensor pin assignment, wherein the sensor pin assignment assigns the plurality of sensor pins to sensors at a first location;
receiving at the interface of the diagnostic module, sensor data from the sensors at the first location according to the sensor pin assignment;
responsive to relocation to a second location, reassigning the plurality of sensor pins to different sensors at the second location; and
receiving at the interface of the diagnostic module, sensor data from the different sensors at the second location according to the reassignment; the method further comprising:
responsive to the relocation to the second location, the diagnostic module transmitting a pin reassignment request to a remote server;
receiving the requested pin reassignment from the remote server; and
using the received pin reassignment for the reassigning the plurality of sensor pins to the different sensors at the second location.

2. The method of claim 1, wherein the pin reassignment request includes a request for data about the second location, and further comprising:
receiving at the diagnostic module the requested data about the second location from the remote server; and
adjusting the reassignment of the plurality of sensor pins according to the received data about the second location.

3. The method of claim 2, wherein the pin reassignment request includes a request for data about other locations, and further comprising:
receiving at the diagnostic module the requested data about the other locations from the remote server; and
adjusting the reassignment of the plurality of sensor pins according to the received data about the other locations.

4. The method of claim 1, wherein the transmitting the pin reassignment request is done in an Internet transmission.

5. The method of claim 1, further comprising:
responsive to the relocation to the second location, the diagnostic module transmitting a request for data about the second location to other diagnostic modules;
receiving the requested data about the second location from one or more of the other diagnostic modules; and
adjusting the reassignment of the plurality of sensor pins to the different sensors at the second location according to the received data about the second location.

6. A method, comprising:
identifying at a server in communication with diagnostic modules over a network, the diagnostic modules each having a plurality of sensor pins for receiving sensor data, a first location of a diagnostic module;
transmitting from the server, a pin assignment to the diagnostic module based on the first location, wherein the pin assignment assigns the plurality of sensor pins of the diagnostic module to sensors at the first location;
detecting at the server, a relocation of the diagnostic module to a second location; and
in response to the server detecting the relocation of the diagnostic module, transmitting from the server, a pin reassignment to the diagnostic module, wherein the pin reassignment reassigns the plurality of sensor pins to different sensors at the second location.

7. A method, comprising:
identifying at a server in communication with diagnostic modules over a network, the diagnostic modules each having a plurality of sensor pins for receiving sensor data, a first location of a diagnostic module;
transmitting from the server, a pin assignment to the diagnostic module based on the first location, wherein the pin assignment assigns the plurality of sensor pins of the diagnostic module to sensors at the first location;
detecting at the server, a relocation of the diagnostic module to a second location; and
transmitting from the server, a pin reassignment to the diagnostic module, wherein the pin reassignment reassigns the plurality of sensor pins to different sensors at the second location;
the method further comprising:
responsive to detecting the relocation of the diagnostic module, the server requesting data about the second location from one or more other diagnostic modules in communication with the server;
receiving the requested data about the second location from the one or more other diagnostic modules;
adjusting the pin reassignment according to the data about the second location; and
transmitting from the server, the adjusted pin reassignment to the diagnostic module at the second location.

8. The method of claim 6, further comprising:
responsive to transmitting the pin reassignment to the diagnostic module, the server transmitting a request for sensor data collected at the second location by the diagnostic module;
receiving the requested sensor data from the diagnostic module;
adjusting the pin reassignment according to the sensor data received; and
transmitting from the server, the adjusted pin reassignment to the diagnostic module at the second location.

9. The method of claim 8, further comprising:
comparing at the server, the sensor data collected at the second location with other sensor data collected at different locations; and
adjusting the pin reassignment according to a comparison between the sensor data collected at the second location and the other sensor data.

10. The method of claim 6, wherein the transmitting each of the pin assignment and the pin reassignment is done in an Internet transmission.

11. The method of claim 1, further comprising:
the diagnostic module comparing sensed data with previously-stored sensed data to determine whether the diagnostic module has been installed at a different location from the first location.

12. The method of claim 1, further comprising:
using a common physical interface of the diagnostic module to connect to sensors at the first and second locations, wherein the first and second locations include a corresponding common physical interface, but wherein each location's corresponding physical interface is further connected to different sensor types with different trip values.

* * * * *